United States Patent [19]

Larsson et al.

[11] 3,976,271

[45] Aug. 24, 1976

[54] CUTTING TOOL

[75] Inventors: Gosta Larsson; Kjell Signar Nystrom, both of Pitea, Sweden

[73] Assignee: Pitea Maskin Industri Nystrom & Larsson AB, Pitea, Sweden

[22] Filed: June 30, 1975

[21] Appl. No.: 591,426

[52] U.S. Cl. .................... 144/241; 83/700; 144/162 R; 144/176; 144/218; 241/294; 241/298; 299/91; 299/93; 403/353

[51] Int. Cl.² ............... B27G 13/00; F16D 1/00; B26D 1/12

[58] Field of Search ............... 241/292.1, 294, 298, 241/92, 93; 83/698, 699, 700, 437; 29/104 R, 105 R, 241; 144/155, 156, 118, 162 R, 162 A, 172, 174, 176, 218, 231, 235; 403/353, 351; 299/91, 93

[56] References Cited
UNITED STATES PATENTS

| | | |
|---|---|---|
| 847,680 | 3/1907 | Morris ................................ 299/93 |
| 1,595,112 | 8/1926 | Mentzer ............................ 299/91 X |
| 2,121,043 | 6/1938 | Noble ................................ 299/93 |
| 2,146,074 | 2/1939 | Kelly ................................. 144/176 |
| 2,735,469 | 2/1956 | West ................................. 83/437 X |
| 2,938,553 | 5/1960 | Standal ........................ 144/162 R X |
| 3,011,535 | 12/1961 | Andrus et al. ................. 144/176 X |

Primary Examiner—Othell M. Simpson
Assistant Examiner—W. D. Bray

[57] ABSTRACT

The tool holder is provided with a setbolt having a T-shaped cross section head including a rectangular end plate which fits into a T-shaped cross section slot in the associated tool providing ease of tool assembly and disassembly for servicing and sharpening. The tool holder and the tool are similarly shaped to provide a smooth exterior surface for the assembly which does not have cavities and pockets causing troublesome accumulations of chips and splinters.

7 Claims, 5 Drawing Figures

CUTTING TOOL

This invention relates to a cutting tool assembly, comprising a cutting edge tool and a tool holder, designed for use in wood chipping machines of the type in which a rotating chipping disc carries a number of cutting tool assemblies on a tool clamping surface and in which one cutting edge of the cutting tool has generally the same length as one dimension of the chips being produced, the tool holder having a first surface which is normally turned away from the chipping disc, and a second surface defining an edge in common with the first surface, the second surface tapering to the first surface in a wedge shaped structure to form a cutter tool seat against which the cutting tool can be clamped.

In chipping machines of the type here concerned the tool holder and cutting edge tool are subjected to strong operational stress by the repeated heavy impacts against the pulpwood being chipped. As is known from previous tool holder types this may result in a gradual displacement of the cutting tool relative to the tool holder and fractures of the cutting edge tool or the tool holder or both. Previous tool holders, owing to their design, also have cavities and pockets in connection with the means employed for clamping the edge tool to the holder, e.g., recesses for bolt heads. Such pockets have a tendency to become obstructed by small chips and splinters, which not only makes it difficult to change the cutting tool but may also prevent the establishment of correct contact between the wood log and the back of the cutting edge and the tool holder when the pockets are located on the tool holder surface that is turned towards the log, thus causing deviations from the desired chip dimensions.

It is an object of the present invention to provide a very simple and robust cutting tool assembly without any of the above-mentioned disadvantages.

Other objects and advantages of the invention will be apparent from the following description and the accompanying drawings.

In carrying out the invention, there is provided a cutting tool assembly comprising a chipping edge cutting tool and an appurtenant tool holder designed for use in wood chippers of a type in which a rotating chipping disc carries a number of cutting tool assemblies on a tool clamping surface and in which one cutting edge of the cutting tool has generally the same length as one dimension of the chips being produced, said tool holder having a first surface which is normally turned away from the chipping disc and a second surface defining an edge in common with said first surface, said second surface tapering to said first surface in a wedge-shaped structure to form a cutting tool seat against which said cutting tool can be clamped, said holder including a setbolt operable to engage and clamp said cutting tool to said holder, said cutting tool and said holder including positioning structures which by mutual engagement define the position of said cutting tool in relation to said holder such that a cutting tool back surface delimited on one side by the cutting edge is on a level with said first holder surface, said cutting tool including a surface operable to rest against said cutting tool seat of said holder, said cutting tool including a groove extending inwardly from said last-mentioned surface of said cutting tool and extending from a point at a predetermined dimension from said back surface of said cutting tool to and through a surface on the side of said cutting tool opposite to said back surface, the cross section of said groove being wider in the interior of said cutting tool than at said tool surface operable to rest against said cutting tool seat, said setbolt being positioned and operable to extend through said tool holder at said second surface operable to define said cutter seat, the end of said setbolt extending through said last-mentioned surface having an enlarged end structure operable to be inserted within said groove in said cutting tool and to slide within said groove when said cutting tool is being clamped to said holder.

Figure 1:
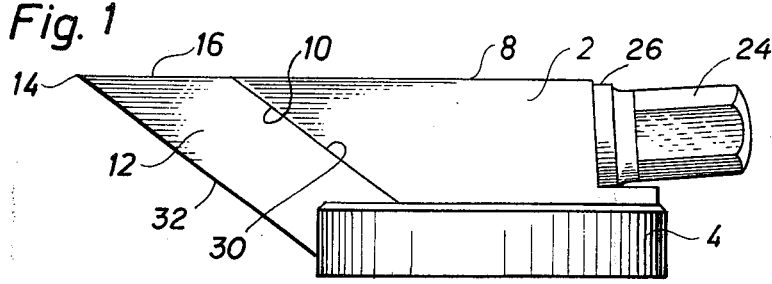
FIG. 1 is a side view of a cutting tool assembly in accordance with the invention.
Figure 2:
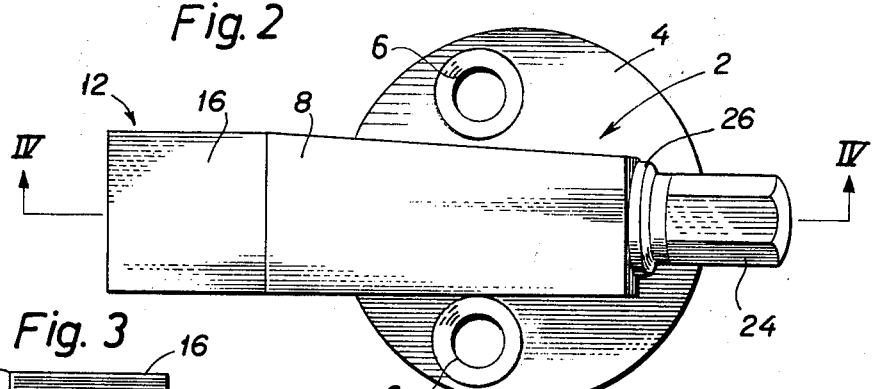
FIG. 2 is a top view of the cutting tool assembly of FIG. 1.
Figure 3:
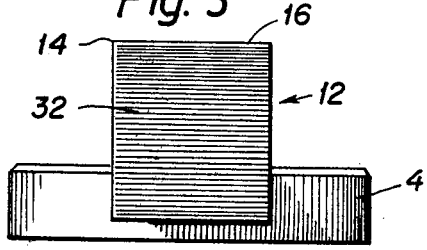
FIG. 3 is a front view of the cutting tool assembly of FIG. 1.

The tool holder depicted as an example in FIGS. 1–4 is made of one piece of metal and comprises an elongated upper part 2 with a substantially rectangular cross section, and a circular base plate 4 underneath. The base plate 4 is provided with two screw holes 6 for anchoring it in a recess on the surface of the chipping disc of a chipper. The tool holder part 2 has a first smooth surface 8, which on the assembled tool holder is turned away from the chipping disc, and a second surface 10, which forms an acute angle with the first surface 8. The angle between surfaces 8 and 10 is preferably the same as the lip angle of a cutting tool 12 that is clamped in the tool holder in a manner to be further described below. The back surface 16 delimited by the edge 14 of the cutting tool 12 is flush with the tool holder surface 8.

Figure 4:
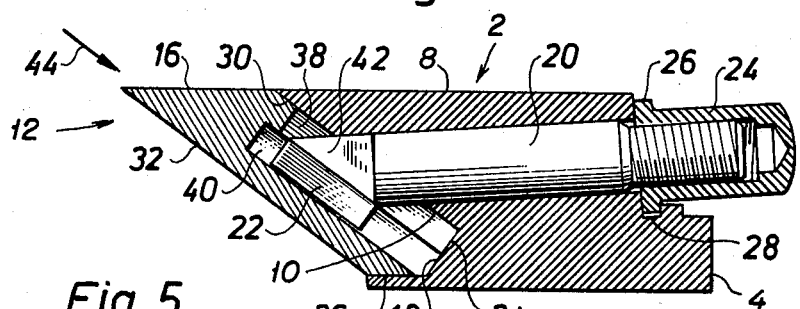
FIG. 4 is a longitudinal sectional side view of the cutting tool assembly corresponding to the view of FIG. 1 and taken at the section plane indicated at IV—IV in FIG. 2.

The surface 10 ends in a shoulder 18 (as shown in FIG. 4), which in conjunction with the surface 10 forms a supporting seat for the cutting tool 12.

An axially movable setbolt 20 extends through a smooth longitudinal drill hole in the elongated tool holder part 2 as indicated in FIG. 4. At its end towards the cutting tool 12, the setbolt 20 is shaped into a structure for engaging the tool in the form of a rectangular end plate 22 in parallel with the surface 10. The opposite end of the bolt 20 carries a screwed on box nut 24 with a circular base flange 26 sunk into a shallow groove 28 in the tool holder, locking the nut 24 against motion along the longitudinal axis of the bolt 20. This also implies that a turn of the nut 24 produces an axial displacement of the bolt 20.

In the embodiment shown in FIG. 4 the cutting tool 12 as seen in a side view has a parallelepipedal shape with two parallel main surfaces 30, 32, the former of which is designed to fit against the tool holder surface 10. The short end surface 34 of the cutting tool which rests against the shoulder 18, is followed by a chamfer 36 that runs parallel to the base plate 4 in order that no part of the cutting tool will project below the said plate. The width of the cutting tool 12 is mainly the same as that of the tool holder 2.

In the surface marked 30 the cutting tool is provided with a longitudinal groove with a substantially T-shaped cross section, the stem 38 of the T being adjacent to the surface 30 and the cross stroke 40 being embedded in the interior of the cutting tool and running parallel to the main surfaces 30, 32. The groove begins at a certain distance from the surface 16 and proceeds to and through the opposite surface 34. The inner, cross-stroke part 40 of the groove is dimensioned so as to enable the end plate 22 of the setbolt 20 to be easily entered at the end surface 34 without binding. The width of the stem part 38 of the groove is such as to accommodate the end portion 42 of the bolt 20, which extends to the plate 22, offering a slip fit.

When fitting the cutting tool 12 into the tool holder 2 the tool is passed in the direction indicated by the arrow 44 in FIG. 4 and parallel to the surface 10 of the tool holder, enabling the plate 22 and the end portion 42 of the bolt 20 to enter the groove 38, 40 from the surface 34 until surface 34 finally hits the tool holder surface 18. The cutting tool is then tightened against the surfaces 10, 18, by turning the box nut 24, which actuates the setbolt 20.

Regrinding of the cutting tool 12 shown in FIG. 4 is effected along the surface 32.

Figure 5:
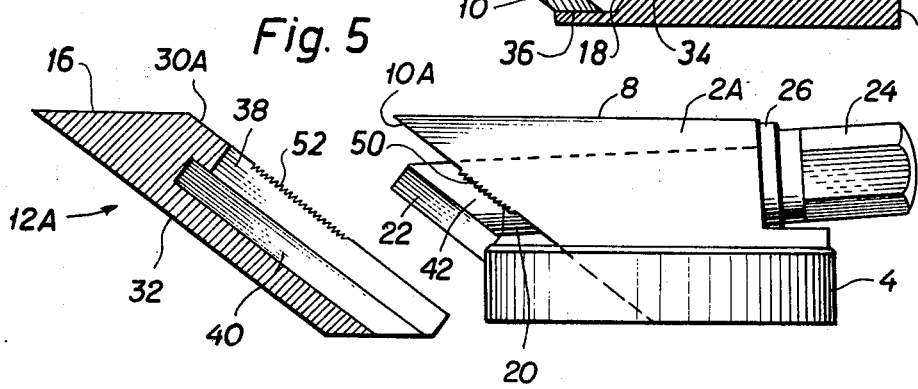
FIG. 5 is a side view corresponding to FIG. 1, but illustrating an alternative embodiment of the invention, and showing the tool detached and in section.

In the alternative embodiment shown in FIG. 5 the tool holder 2A differs from the above-mentioned embodiment in that the seat shoulder 18 is replaced by a zone of transverse knurls 50 in surface 10A at the level of the through hole for the bolt 20. The cutting tool 12A differs from the embodiment of FIGS. 1–4 in that it has a zone of transverse knurls 52 for joint action with the knurls 50 at the interface 30A. The zone 52 extends over a larger area along the surface 30A than does the knurl zone 50. In other respects the embodiment according to FIG. 5 coincides in the main with the embodiment shown in FIG. 4, and corresponding parts are similarly numbered.

In the embodiment depicted in FIG. 5 mutual engagement of the knurls of zones 50 and 52 has been substituted for the engagement of surfaces 18 and 34. In this embodiment sharpening of the edge tool can be effected along the surface 16 while retaining that surface on a level with the surface 8 of the tool holder since the knurls 50, 52 enable gradual outward shifts of the tool to be made for the purpose of regrinding.

It is apparent from the foregoing description and the accompanying illustrations that a very strong and robust tool holder is achieved, which permits optimum tool and tool holder designs to be arrived at with respect to mechanical strength. Also, the clamping of the tool by means of the setbolt 20 in conjunction with the groove 38, 40 is particularly firm and safe. A matter of specific importance in this context is the inclined position of the bolt end plate 22 relative to the axis of the bolt 20, enabling the tool to be firmly clamped against both surfaces 10, 18, or against surface 10 in conjunction with a firm engagement of the knurls 50, 52. Further, the tool holder, with the tool fitted, displays smooth external surfaces without any recesses or pockets that would otherwise allow small chips and splinters to accumulate. Hence the tool and tool holder expose a smooth and continuous surface 8, 16 to the wood logs being chipped, and the nut 24 is located below the log level. This nut is, however, easily accessible from the top of the chipping disc and its easy accessibility cannot be hampered by accumulations of scrap materials.

We claim:

1. A cutting tool assembly comprising
   a chipping edge cutting tool and an appurtenant tool holder designed for use in wood chippers of a type in which a rotating chipping disc carries a number of cutting tool assemblies on a tool clamping surface and in which one cutting edge of the cutting tool has generally the same length as one dimension of the chips being produced,
   said tool holder having a first surface which is normally turned away from the chipping disc and a second surface defining an edge in common with said first surface,
   said second surface tapering to said first surface in a wedge-shaped structure to form a cutting tool seat against which said cutting tool can be clamped.
   said holder including a setbolt operable to engage and clamp said cutting tool to said holder,
   said cutting tool and said holder including positioning structures which by mutual engagement define the position of said cutting tool in relation to said holder such that a cutting tool back surface delimited on one side by the cutting edge is on a level with said first holder surface,
   said cutting tool including a surface operable to rest against said cutting tool seat of said holder,
   said cutting tool including a groove extending inwardly from said last-mentioned surface of said cutting tool and extending from a point at a predetermined dimension from said back surface of said cutting tool to and through a surface on the side of said cutting tool opposite to said back surface,
   the cross section of said groove being wider in the interior of said cutting tool than at said tool surface operable to rest against said cutting tool seat,
   said setbolt being positioned and operable to extend through said tool holder at said second surface operable to define said cutter seat,
   the end of said setbolt extending through said last-mentioned surface having an enlarged end structure operable to be inserted within said groove in said cutting tool and to slide within said groove when said cutting tool is being clamped to said holder.

2. A cutting tool assembly as claimed in claim 1 wherein
   said setbolt is slidable in its longitudinal direction within the body of said tool holder,
   and wherein there is provided a screw threaded nut attached to the free end of said setbolt,
   said nut being locked to the body of said tool holder to prevent motion of said setbolt in the longitudinal direction.

3. A cutting tool assembly as claimed in claim 2 including
   locking means for locking said nut and said setbolt against longitudinal motion,
   said locking means comprising a circular base flange on said nut and a shallow groove in said tool holder into which said nut base flange is engaged when said nut is in the assembled position.

4. A cutting tool assembly as claimed in claim 3 wherein said nut is a box nut having a closed outer end.

5. A cutting tool assembly as claimed in claim 1 wherein
   said first and second surfaces of said tool holder intersect at said common edge in an acute angle of the same order of magnitude as the angle between the surfaces of said cutting tool which meet to form said cutting edge.

6. A cutting tool assembly as claimed in claim 5 wherein
said positioning structures which by mutual engagement define the position of said cutting tool in relation to said tool holder comprise a concavity within said tool holder extending from the end of said second surface opposite to said edge in common with said first surface and forming a seat for said cutting tool.

7. A cutting tool assembly as claimed in claim 5 wherein
said positioning structures which by mutual engagement define the position of said cutting tool in relation to said holder comprise knurls in said second surface of said tool holder and corresponding knurls formed in the surface of said cutting tool in engagement with said knurls of said second surface of said tool holder,
said knurls in said tool holder being in the form of substantially straight parallel ribs and grooves and being substantially parallel with said edge in common with said first surface,
said knurls in said cutting tool being substantially parallel to said cutting edge.

* * * * *

UNITED STATES PATENT AND TRADEMARK OFFICE
CERTIFICATE OF CORRECTION

PATENT NO. : 3,976,271
DATED : August 24, 1976
INVENTOR(S) : GOSTA LARSSON and KJELL SIGNAR NYSTROM It is certified that error appears in the above-identified patent and that said Letters Patent are hereby corrected as shown below:

On the title page of the patent, left hand column, after line 9 and before line 10, insert:
--[30]   Foreign Application Priority Data
    July 3, 1974   Sweden............7408778  --.

Signed and Sealed this

Thirtieth Day of November 1976

[SEAL]

Attest:

RUTH C. MASON
*Attesting Officer*

C. MARSHALL DANN
*Commissioner of Patents and Trademarks*